US012791912B2

(12) United States Patent
Lee

(10) Patent No.: US 12,791,912 B2
(45) Date of Patent: Nov. 10, 2026

(54) REFLECTIVE MODULE AND CAMERA MODULE INCLUDING REFLECTIVE MODULE

(71) Applicant: Samsung Electro-Mechanics Co., Ltd., Suwon-si (KR)

(72) Inventor: Hong Joo Lee, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 35 days.

(21) Appl. No.: 19/092,792

(22) Filed: Mar. 27, 2025

(65) Prior Publication Data

US 2025/0314945 A1 Oct. 9, 2025

(30) Foreign Application Priority Data

Apr. 5, 2024 (KR) ........................ 10-2024-0046887
Jul. 12, 2024 (KR) ........................ 10-2024-0092485

(51) Int. Cl.

| | |
|---|---|
| ***G03B 5/00*** | (2021.01) |
| ***G02B 7/182*** | (2021.01) |
| ***G02B 13/00*** | (2006.01) |
| ***G02B 26/08*** | (2006.01) |

(52) U.S. Cl.

CPC ............. *G03B 5/00* (2013.01); *G02B 7/1821* (2013.01); *G02B 13/0065* (2013.01); *G02B 26/0816* (2013.01); *G03B 2205/0069* (2013.01); *G03B 2217/002* (2013.01); *G03B 2217/18* (2013.01)

(58) Field of Classification Search

CPC ............................ G02B 7/1821; H04N 23/685
See application file for complete search history.

(56) References Cited

U.S. PATENT DOCUMENTS

2020/0351421 A1 11/2020 Park et al.
2020/0396358 A1 12/2020 Park et al.
2021/0136261 A1* 5/2021 Lee ........................ G03B 30/00
2022/0103725 A1* 3/2022 Lee .......................... G02B 7/09
2022/0279093 A1 9/2022 Kwon et al.
2023/0350160 A1 11/2023 Hong
(Continued)

FOREIGN PATENT DOCUMENTS

KR 10-1945710 B1 2/2019
KR 10-2020-0126871 A 11/2020
KR 10-2020-0143187 A 12/2020
(Continued)

OTHER PUBLICATIONS

Korean Office Action issued on Oct. 23, 2025, in counterpart Korean Patent Application No. 10-2024-0092485 (8 pages in English, 6 pages in Korean).

*Primary Examiner* — Cynthia Calderon
(74) *Attorney, Agent, or Firm* — NSIP Law

(57) ABSTRACT

A reflective module includes a housing; a guide member disposed in the housing and configured to rotate about a first rotation axis; a holder disposed on the guide member and configured to rotate relative to the guide member about a second rotation axis perpendicular to the first rotation axis; a reflective member disposed on the holder; a first driving portion including a first magnet disposed on the holder, and a first coil facing the first magnet; and a first position sensor disposed in the housing, wherein the first position sensor is spaced apart from the first coil in a direction of the first rotation axis.

15 Claims, 13 Drawing Sheets

(56) References Cited

U.S. PATENT DOCUMENTS

| | | | | |
|---|---|---|---|---|
| 2024/0126158 | A1* | 4/2024 | Yedid | G02B 13/0065 |
| 2025/0180861 | A1* | 6/2025 | Kwon | G02B 7/1828 |

FOREIGN PATENT DOCUMENTS

| | | | |
|---|---|---|---|
| KR | 10-2365701 | B1 | 2/2022 |
| KR | 10-2581965 | B1 | 9/2023 |
| KR | 10-2023-0153757 | A | 11/2023 |

* cited by examiner

REFLECTIVE MODULE AND CAMERA MODULE INCLUDING REFLECTIVE MODULE

CROSS-REFERENCE TO RELATED APPLICATIONS

This application claims the benefit under 35 USC 119(a) of Korean Patent Application Nos. 10-2024-0046887 filed on Apr. 5, 2024, and 10-2024-0092485 filed on Jul. 12, 2024, in the Korean Intellectual Property Office, the entire disclosures of which are incorporated herein by reference for all purposes.

BACKGROUND

1. Field

The present disclosure relates to a reflective module and a camera module including a reflective module.

2. Description of Background

Recently, camera modules bending the path of light by disposing a reflective member in front of a lens module are being used in mobile devices.

This type of camera module may compensate for camera shake during shooting by rotating the reflective member around two axes that are perpendicular to each other.

In order to do this, it is necessary to sense a position of the reflective member to perform accurate shake compensation and improve the resolution of an image.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a reflective module includes a housing; a guide member disposed in the housing and configured to rotate about a first rotation axis; a holder disposed on the guide member and configured to rotate relative to the guide member about a second rotation axis perpendicular to the first rotation axis; a reflective member disposed on the holder; a first driving portion including a first magnet disposed on the holder, and a first coil facing the first magnet; and a first position sensor disposed in the housing, wherein the first position sensor is spaced apart from the first coil in a direction of the first rotation axis.

A surface of the first magnet may have a first polarity, a first neutral region, a second polarity, a second neutral region and a first polarity sequentially arranged in the direction of the first rotation axis, and at least a portion of the first position sensor may face the second neutral region.

An area of the second polarity of the first magnet may be greater than an area of one of the two first polarities.

Thee one of the two first polarities may be disposed adjacent to the second neutral region.

The reflective module may further include a first sensing magnet disposed on the holder and spaced apart from the first magnet in the direction of the first rotation axis, wherein the first position sensor may be disposed so that at least a portion of the first position sensor faces a space between the first magnet and the first sensing magnet.

The reflective module may further include a first sensing magnet disposed on the holder and spaced apart from the first magnet in the direction of the first rotation axis, wherein a surface of the first magnet may have a first polarity, a neutral region, and a second polarity sequentially arranged in the direction of the first rotation axis, and a surface of the first sensing magnet may have one polarity, and the one polarity of the first sensing magnet may be opposite to a polarity of the first magnet adjacent to the first sensing magnet.

The reflective module may further include a first sensing magnet disposed on the holder and spaced apart from the first magnet in the direction of the first rotation axis, wherein a surface of the first magnet may have a first polarity, a neutral region, and a second polarity sequentially arranged in the direction of the first rotation axis, and a surface of the first sensing magnet may have a second polarity, a neutral region, and a first polarity sequentially arranged in the direction of the first rotation axis.

At least a portion of the first position sensor may face the neutral region of the first sensing magnet.

The reflective module may further include a first ball member disposed between the holder and the guide member and including a plurality of balls spaced apart from each other in a direction of the second rotation axis.

The reflective module may further include a second driving portion including a second magnet disposed on the guide member, and a second coil facing the second magnet; a second sensing magnet disposed on the guide member; and a second position sensor disposed in the housing, wherein the second position sensor may be spaced apart from the second coil in a direction perpendicular to the first rotation axis.

The reflective module may further include a second ball member disposed between the guide member and the housing and including a first ball forming the first rotation axis, wherein the second sensing magnet may be spaced apart from the first ball in a direction perpendicular to both the first rotation axis and the second rotation axis.

The second sensing magnet may have a first polarity, a neutral region, and a second polarity sequentially arranged in a direction of the second rotation axis.

In another general aspect, a camera module includes a holder; a reflective member disposed on the holder; a guide member on which the holder is disposed; a housing in which the holder and the guide member are disposed; a lens module having an optical axis into which light reflected from the reflective member is incident; a first driving portion including a first magnet mounted on the holder, and a first coil facing the first magnet in a direction of the optical axis; and a first position sensor disposed in the housing, wherein the guide member is configured to rotate together with the holder about a first rotation axis, the holder is configured to rotate relative to the guide member about a second rotation axis perpendicular to the first rotation axis, and the first position sensor is spaced apart from a virtual line extending along the optical axis in a direction of the first rotation axis.

A surface of the first magnet may have one or more neutral regions arranged in a direction of the second rotation axis.

Magnetic force lines may pass in one direction through an upper portion of the first coil in the direction of the first rotation axis, magnetic force lines may pass in another direction opposite to the one direction through a lower portion of the first coil in the direction of the first rotation axis, magnetic force lines may pass in the other direction through an upper portion of the first position sensor in the direction of the first rotation axis, and magnetic force lines may pass in the one direction through a lower portion of the first position sensor in the direction of the first rotation axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
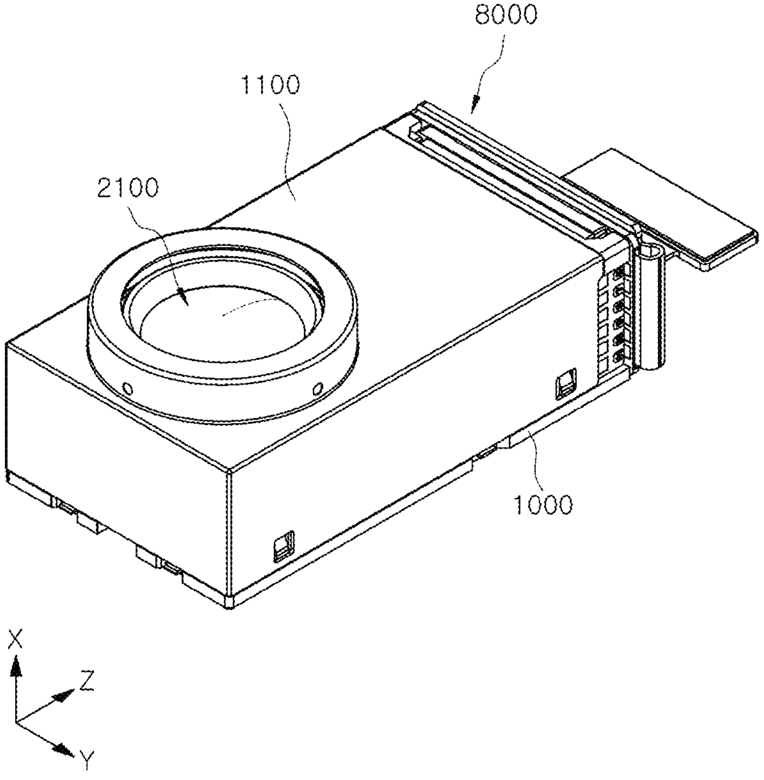
FIG. 1 is a perspective view of a camera module according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The present disclosure relates to a camera module, and the camera module may be mounted in portable electronic devices such as mobile communication terminals, smartphones, and tablet PCs.

Figure 2:
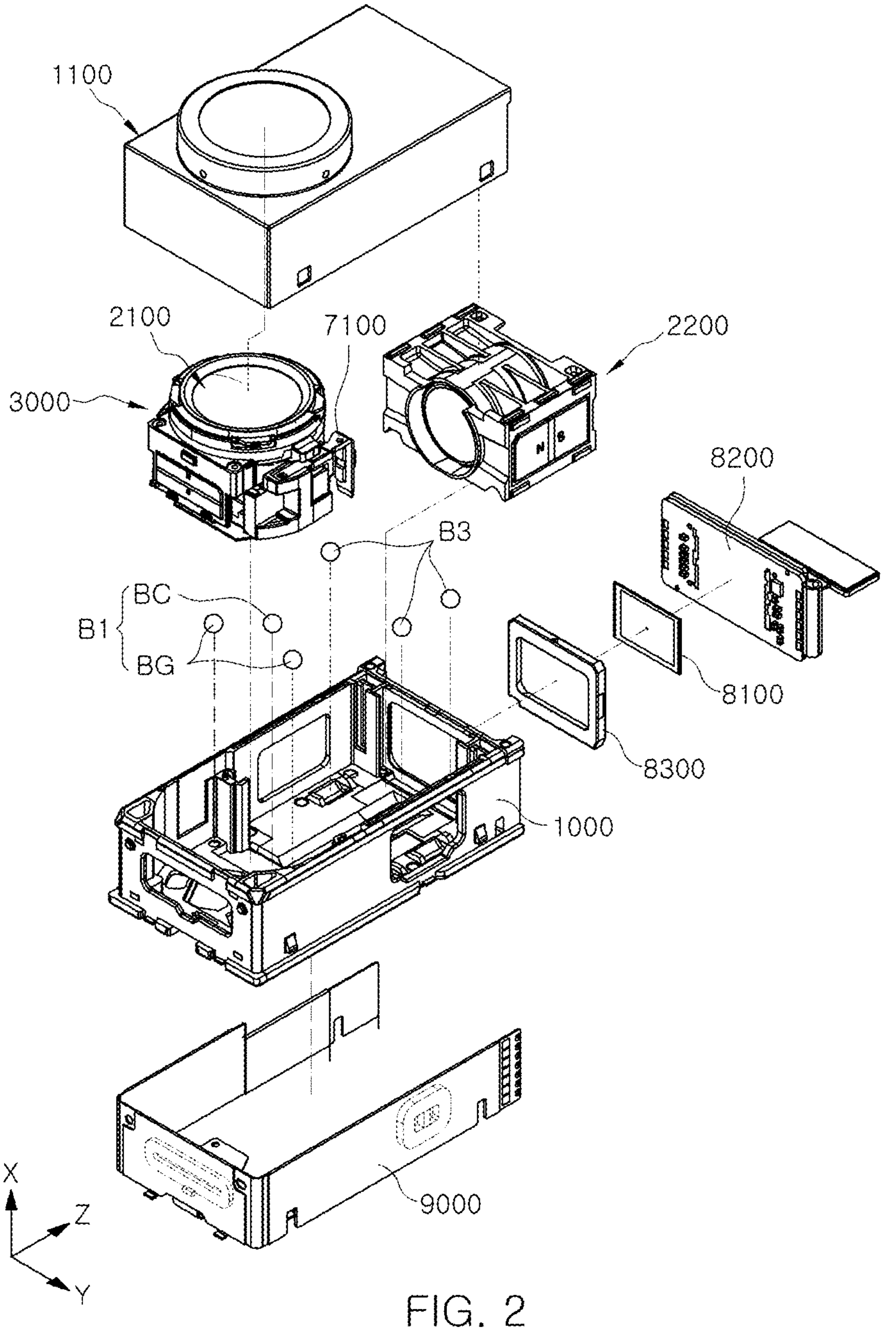
FIG. 2 is an exploded perspective view of the camera module of FIG. 1.
Figure 3:
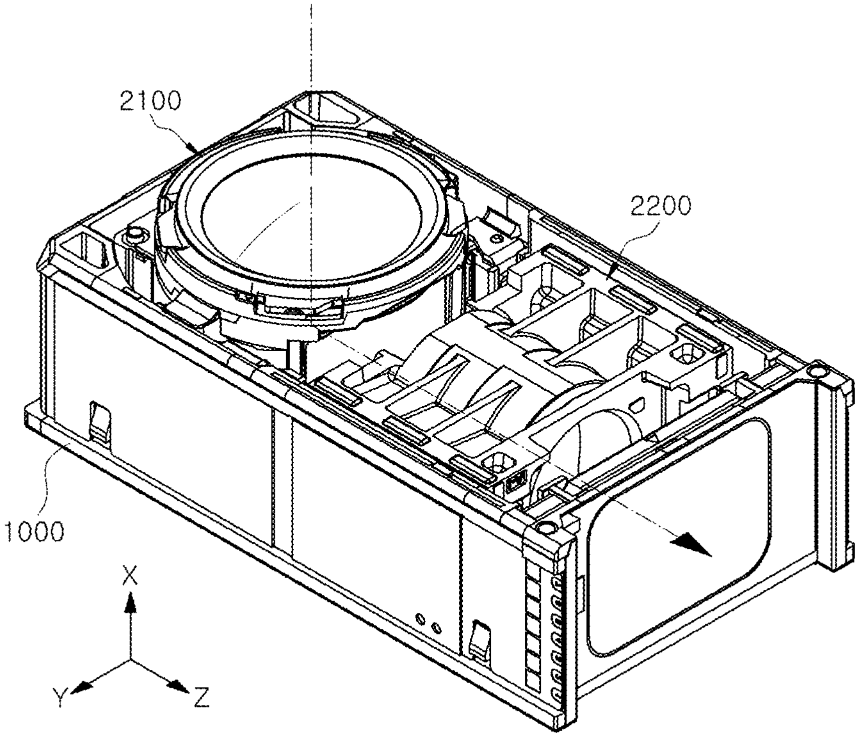
FIG. 3 is a perspective view of the camera module of FIG. 1 with the case removed.
Figure 4:
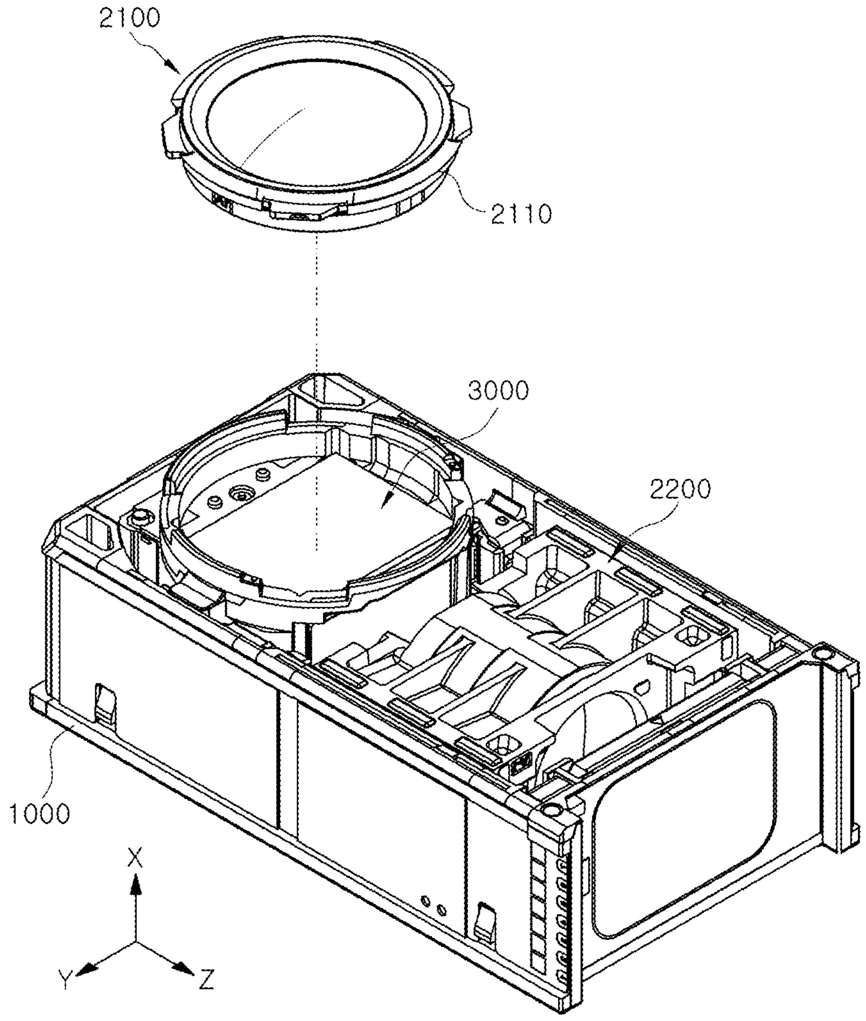
FIG. 4 is a perspective view illustrating a first lens module of FIG. 3 in an exploded state.

FIG. 1 is a perspective view of a camera module according to an embodiment of the present disclosure, FIG. 2 is an exploded perspective view of the camera module of FIG. 1, FIG. 3 is a perspective view of the camera module of FIG. 1 with the case removed, and FIG. 4 is a perspective view illustrating a first lens module in FIG. 3 in an exploded state.

Referring to FIGS. 1 and 4, a camera module may include a first lens module 2100, a reflective module 3000, a second lens module 2200, and a housing 1000.

The first lens module 2100 may include at least one lens and a first lens barrel 2110. The at least one lens may have a first optical axis (X-axis) and be mounted in the first lens barrel 2110. The first optical axis (X-axis) may extend in the vertical direction with respect to FIG. 4.

The first lens module 2100 may be disposed in front of the reflective module 3000. Here, "in front of the reflective module 3000" may mean in the positive first optical axis (X-axis) direction (+X-axis direction) with respect to the reflective module 3000. For example, the first lens module 2100 may be disposed higher than the reflective module 3000 in the direction of the first optical axis (X-axis).

The first lens module 2100 may be coupled with the reflective module 3000. For example, the first lens module 2100 may be coupled with a holder 3200 (see FIG. 5) of the reflective module 3000.

The reflective module 3000 may include a reflective member 3100 (see FIG. 5), and the reflective member 3100 may include a reflective surface reflecting light passing through the first lens module 2100. For example, the reflective member 3100 may be a prism or a mirror. The reflective member 3100 may be coupled with the holder 3200.

The first lens module 2100 and the reflective module 3000 may be disposed in the housing 1000.

In an embodiment, the camera module may further include the second lens module 2200. The reflective module 3000 may be disposed between the first lens module 2100 and the second lens module 2200. The second lens module 2200 may include a plurality of lenses and a second lens barrel 2210 (see FIG. 12). The plurality of lenses may have a second optical axis (Z-axis) and be mounted in the second lens barrel 2210.

The first optical axis (X-axis) of the first lens module 2100 and the second optical axis (Z-axis) of the second lens module 2200 may be perpendicular to each other.

The first lens module 2100 may include one or more lenses, and the second lens module 2200 may include a plurality of lenses.

The one or more lenses of the first lens module 2100 may be circular when viewed in the first optical axis (X-axis) direction. At least one lens among the plurality lenses of the second lens module 2200 may be non-circular when viewed in the second optical axis (Z-axis) direction (this feature is not shown in the drawings). For example, a non-circular lens may have different lengths in two directions perpendicular to the second optical axis (Z-axis) and perpendicular to each other. In an embodiment, the non-circular lens may have a length in a third axis (Y-axis) direction perpendicular to both the first optical axis (X-axis) direction and the second optical axis (Z-axis) direction that is longer than a length of the non-circular lens in the first optical axis (X-axis) direction.

Although the camera module is described in the specification as including the first lens module 2100 and the second lens module 2200, the camera module is not limited thereto, and the camera module may also be configured to include only one of the first lens module 2100 and the second lens module 2200.

In an embodiment, the first lens module 2100 and the reflective member 3100 may be configured to rotate together for shake correction. That is, the first lens module 2100 and the reflective member 3100 may rotate together about two axes perpendicular to each other.

For example, the first lens module 2100 and the reflective member 3100 may rotate together about the first optical axis (X-axis) as a rotation axis, and may rotate together about the third axis (Y-axis) perpendicular to both the first optical axis (X-axis) and the second optical axis (Z-axis) as a rotation axis.

In an embodiment, the second lens module 2200 may be moved in the second optical axis (Z-axis) direction for focus adjustment.

The camera module may further include an image sensor module 8000.

The image sensor module 8000 may include a sensor housing 8300, an image sensor 8100, and a printed circuit board 8200, and may further include an infrared blocking filter (not shown in the drawings).

The infrared blocking filter may be mounted on the sensor housing 8300. The infrared blocking filter may serve to block light in the infrared region from reaching the image sensor 8100.

The printed circuit board 8200 may be coupled with the sensor housing 8300, and the image sensor 8100 may be disposed on the printed circuit board 8200.

Light passing through the second lens module 2200 may be received by the image sensor module 8000 (e.g., the image sensor 8100).

The camera module may further include a case 1100. The case 1100 may be coupled to the housing 1000 to cover the upper portion of the housing 1000. The case 1100 may have an opening, and the first lens module 2100 may be disposed in the opening.

At least a portion of the first lens module 2100 may be disposed to protrude outside the housing 1000.

Figure 5:
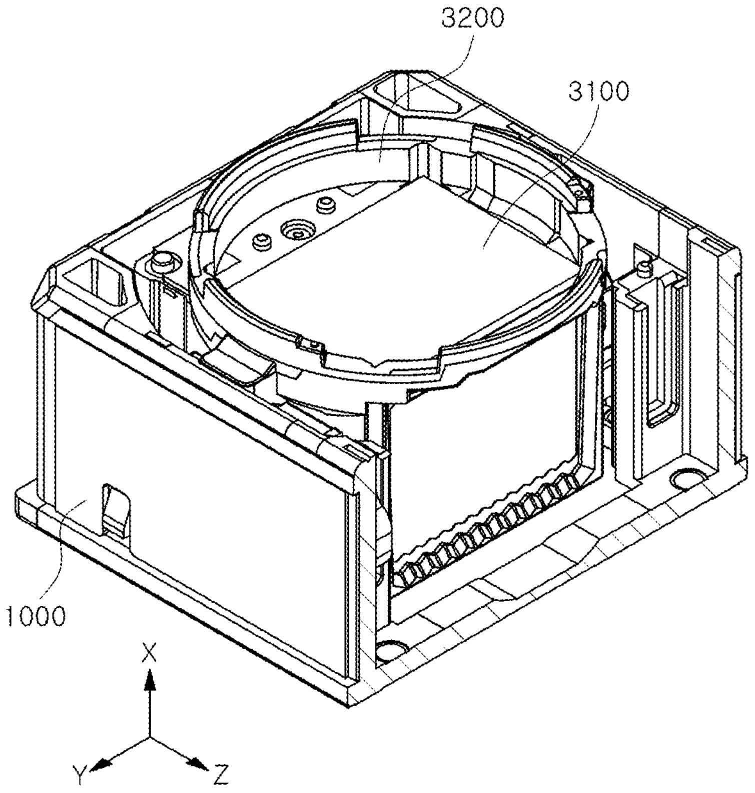
FIG. 5 is a perspective view of a reflective module according to an embodiment of the present disclosure.
Figure 6:
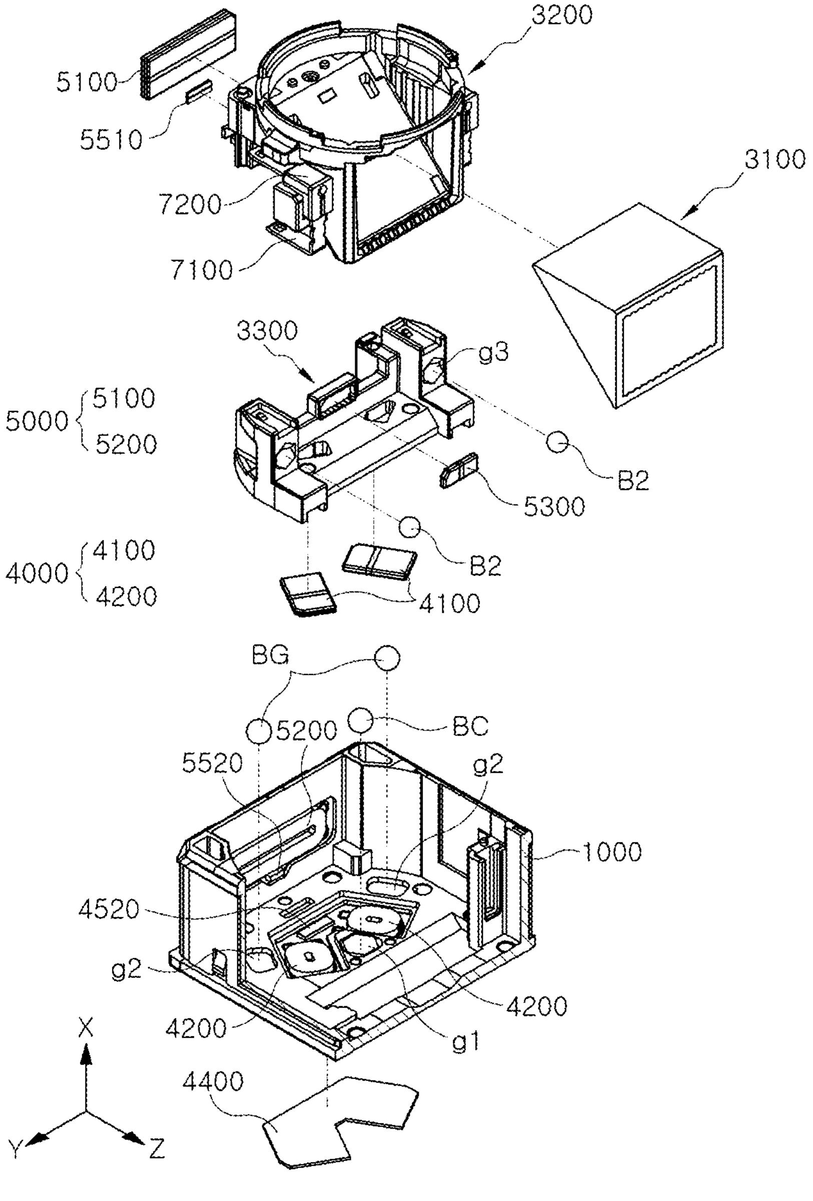
FIG. 6 is an exploded perspective view of the reflective module of FIG. 5.
Figure 7:
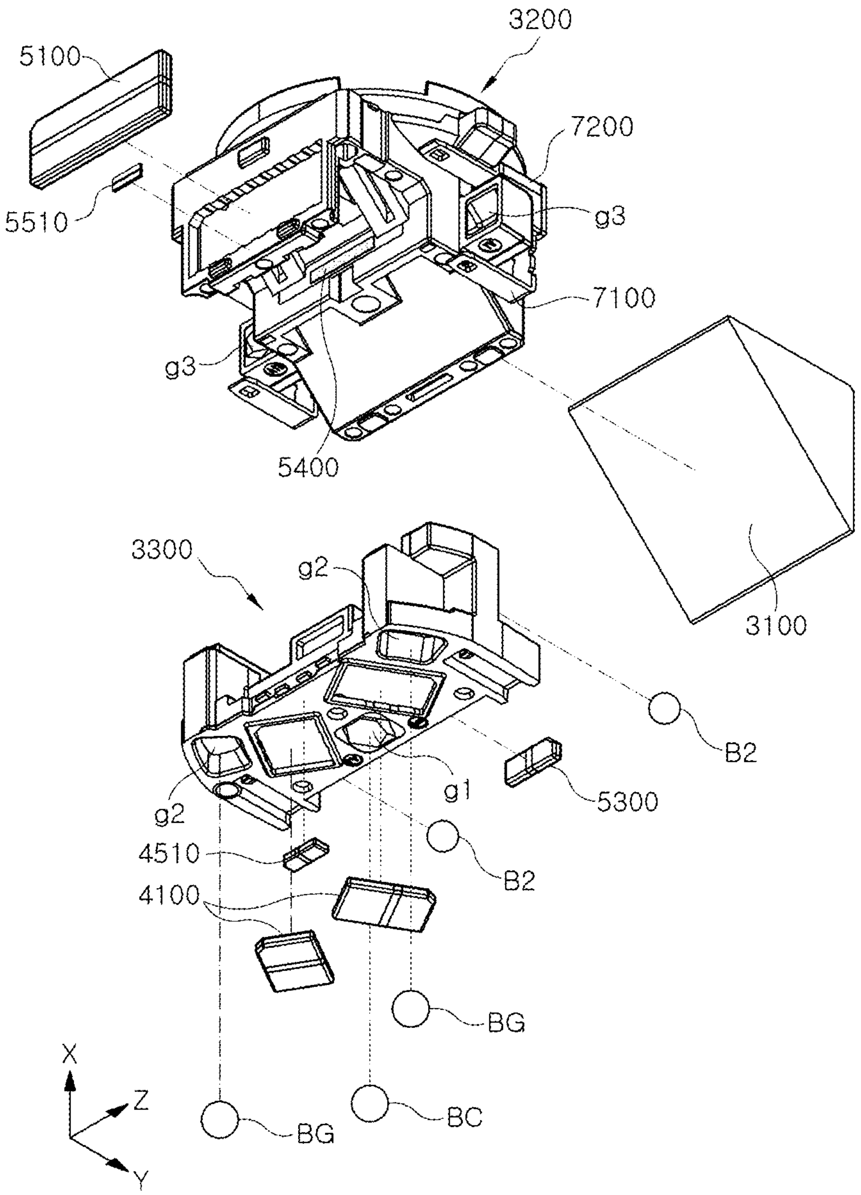
FIG. 7 is a bottom perspective view of FIG. 6.

FIG. 5 is a perspective view of a reflective module according to an embodiment of the present disclosure, FIG. 6 is an exploded perspective view of the reflective module of FIG. 5, and FIG. 7 is a bottom perspective view of FIG. 6.

Referring to FIGS. 5 to 7, a reflective module 3000 may include a reflective member 3100, a holder 3200, and a guide member 3300.

The reflective member 3100 may have a reflective surface reflecting light that has passed through the first lens module 2100. For example, the reflecting member 3100 may be a prism or a mirror.

When the reflective member 3100 is a prism, the reflective member 3100 may be in a shape of a rectangular solid or a cube divided into two halves in a diagonal direction. The prism may include an incident surface where light enters, a reflective surface reflecting light that has passed through the incident surface, and an exit surface where light reflected from the reflective surface exits.

The reflective member 3100 may be mounted on the holder 3200. A first lens module 2100 may be disposed in front of the reflective member 3100. In an embodiment, the first lens module 2100 may be mounted on the holder 3200.

The holder 3200 is disposed on the guide member 3300 and configured to be rotatable relative to the guide member 3300. The guide member 3300 is disposed in the housing 1000 and configured to be rotatable relative to the housing.

The guide member 3300 may be rotated about the first optical axis (X-axis) as a rotation axis. For example, the guide member 3300 may be rotated relative to the housing 1000 about the first optical axis (X-axis) as a rotation axis. The first lens module 2100 and the holder 3200 may also be rotated together with the guide member 3300 about the first optical axis (X-axis) as a rotation axis. The first optical axis (X-axis) may also be referred to as a first rotation axis.

The holder 3200 may be rotated about the third axis (Y-axis) perpendicular to both the first optical axis (X-axis) and the second optical axis (Z-axis) as a rotation axis. For example, the holder 3200 may be rotated relative to the guide member 3300 about the third axis (Y-axis) as a rotation axis. The first lens module 2100 may be rotated together with the holder 3200 about the third axis (Y-axis) as a rotation axis. The third axis (Y-axis) may also be referred to as a second rotation axis.

A first driving portion 4000 may be provided to rotate the reflective module 3000. The first driving portion 4000 may include a first magnet 4100 and a first coil 4200. The guide member 3300 may be rotated relative to the housing 1000 about the first optical axis (X-axis) as a rotation axis. Since the holder 3200 and the first lens module 2100 may be disposed on the guide member 3300, the holder 3200 and the first lens module 2100 may also be rotated together with the guide member 3300 about the first optical axis (X-axis) as a rotation axis.

The first magnet 4100 may be mounted on the guide member 3300. As an example, the first magnet 4100 may be mounted on a surface of the guide member 3300. The surface of the guide member 3300 may be a surface of the guide member 3300 facing the housing 1000 in the direction of the first optical axis (X-axis). For example, the surface of the guide member 3300 may be a lower surface of the guide member 3300.

The first magnet 4100 may include two magnets spaced apart from each other. The two magnets may be inclined with respect to each other in a plane perpendicular to the first optical axis (X-axis).

Each of the two magnets of the first magnet 4100 may be magnetized so that a surface facing the first coil 4200 may have both a first polarity P1 and a second polarity P2. The first polarity P1 and the second polarity P2 are polarities opposite to each other, so that when the first polarity P1 is an N-pole, the second polarity P2 is an S-pole.

In an embodiment, one of the two magnets of the first magnet 4100 (hereinafter referred to as a 1-1 magnet) may have a surface facing the first coil 4200 having a first polarity P1 and a second polarity P2, and a neutral region N1 formed between the first polarity P1 and the second polarity P2 (see FIG. 8).

The remaining one of the two magnets of the first magnet 4100 (hereinafter referred to as a 1-2 magnet) may have a surface facing the first coil 4200 having a second polarity P2 and a first polarity P1, and a neutral region N1 formed between the second polarity P2 and the first polarity P1 (see FIG. 8). Thus the polarities of the 1-2 magnet are arranged in an opposite direction to the polarities of the 1-1 magnet.

The 1-1 magnet and the 1-2 magnet may be disposed so that a distance between them decreases in a negative direction of the second optical axis (Z-axis) (a −Z-axis direction).

For example, a distance between an N-pole (P1) of the surface of the 1-1 magnet facing the first coil 4200 and an S-pole (P2) of the surface of the 1-2 magnet facing the first coil 4200 may be smaller than a distance between the S-pole (P2) of the surface of the 1-1 magnet facing the first coil 4200 and the N-pole (P1) of the surface of the 1-2 magnet facing the first coil 4200 (the opposite is also possible).

The first coil 4200 may be disposed in a position facing the first magnet 4100. In an embodiment, the first coil 4200 may be disposed facing the first magnet 4100 in the first optical axis (X-axis) direction.

The first coil 4200 is disposed on a substrate 9000, and the substrate 9000 is mounted on the housing 1000 so that the first magnet 4100 and the first coil 4200 face each other in the first optical axis (X-axis) direction.

The housing 1000 may have a through-hole penetrating the housing 1000 in the first optical axis (X-axis) direction, and the first coil 4200 may be disposed in the through-hole so that the first coil 4200 directly faces the first magnet 4100 in the first optical axis (X-axis) direction.

The first coil 4200 may include two coils. The two coils may be inclined with respect to each other in a plane perpendicular to the first optical axis (X-axis).

During shake correction, the first magnet 4100 is a moving member mounted on the guide member 3300 and rotates with the guide member 3300, and the first coil 4200 is a fixed member fixed to the substrate 9000.

When power is applied to the first driving portion 4000, the first driving portion 4000 may generate a driving force to rotate the guide member 3300 about the first optical axis (X-axis).

A first ball member B1 may be disposed between the guide member 3300 and the housing 1000.

The first ball member B1 may include a first ball BC forming a rotational axis of the guide member 3300, and a plurality of guide balls BG supporting the rotation of the guide member 3300.

The guide member 3300 may be supported at three points by the first ball BC and the plurality of guide balls BG.

A virtual line extending in a direction of the first optical axis (X-axis) of the first lens module 2100 may pass through the first ball BC.

An attractive force may act between the guide member 3200 and the housing 1000. In an embodiment, a first pulling yoke 4400 may be disposed at a position facing the first magnet 4100 in the direction of the first optical axis (X-axis).

The first pulling yoke 4400 may be disposed on the substrate 9000. For example, the first coil 4200 may be disposed on an inner or upper surface of the substrate 9000, and the first pulling yoke 4400 may be disposed on an outer or lower surface of the substrate 9000.

The first magnet 4100 and the first pulling yoke 4400 may generate a attractive force between each other. For example, the first pulling yoke 4400 may be made of a magnetic material. The attractive force acts between the first magnet 4100 and the first pulling yoke 4400 in the direction of the first optical axis (X-axis).

The first ball member B1 may be maintained in contact with the guide member 3300 and the housing 1000 by the attractive force generated between the first magnet 4100 and the first pulling yoke 4400.

A first guide groove g1 and a second guide groove g2 may be formed in surfaces of the guide member 3300 and the housing 1000 facing each other in the first optical axis (X-axis) direction. The first ball BC may be disposed in the first guide groove g1, and the plurality of guide balls BG may be disposed in the second guide groove g2.

The first ball BC makes three-point contact with the first guide groove g1 of the guide member 3300 and three-point contact with the first guide groove g1 of the housing 1000.

The first ball BC may be disposed between the first guide groove g1 of the guide member 3300 and the first guide groove g1 of the housing 1000 to form a rotation axis of the guide member 3300.

In an embodiment, each of the plurality of guide balls BG may be in one-point contact with the second guide groove g2 of the guide member 3300 and one-point contact with the second guide groove g2 of the housing 1000.

In another embodiment, each of the plurality of guide balls BG may be in two-point contact with the second guide groove g2 of the guide member 3300 and one-point contact with the second guide groove g2 of the housing 1000 (or vice versa).

A second driving portion 5000 may be provided to rotate the holder 3200 relative to the guide member 3300. The second driving portion 5000 includes a second magnet 5100 and a second coil 5200. The holder 3200 may be rotated about the third axis (Y-axis) by the second driving portion 5000. Since the first lens module 2100 is disposed in the holder 3200, the first lens module 2100 may be rotated with the holder 3200 about the third axis (Y-axis) by the second driving portion 5000.

The second magnet 5100 may be mounted on the holder 3200. As an example, the second magnet 5100 may be mounted on a side surface of the holder 3200.

The second magnet 5100 may be magnetized so that a surface of the second magnet facing the second coil 5200 has both an N-pole and an S-pole. In an embodiment, the surface of the second magnet 5100 facing the second coil 5200 may have an N-pole, a neutral region, and an S-pole sequentially arranged in the first optical axis (X-axis) direction.

The second magnet 5100 may have a shape having a length extending in the direction of the third axis (Y-axis). For example, the second coil 5200 may be formed to have a length in the third axis (Y-axis) direction that is longer than a length in the first optical axis (X-axis) direction.

The second coil 5200 may be disposed on the substrate 9000, and the substrate 9000 may be mounted on the housing 1000 so that the second magnet 5100 and the second coil 5200 face each other in the second optical axis (Z-axis) direction.

The second coil 5200 may have a shape having a length extending in the third axis (Y-axis) direction. For example, the second coil 5200 may be formed to have a length in the third axis (Y-axis) direction that is longer than a length in the first optical axis (X-axis) direction.

The second coil 5200 is disposed on the substrate 9000, and the substrate 9000 is mounted on the housing 1000 so that the second magnet 5100 and the second coil 5200 face each other in the direction of the second optical axis (Z-axis).

The housing 1000 may have a through-hole penetrating the housing 1000 in the second optical axis (Z-axis) direction, and the second coil 5200 may be disposed in the through-hole so that the second coil 5200 directly faces the second magnet 5100 in the second optical axis (Z-axis) direction.

During shake correction, the second magnet 5100 is a moving member mounted on the holder 3200 and rotates with the holder 3200, and the second coil 5200 is a fixed member fixed to the substrate 9000.

When power is applied to the second driving portion 5000, the second driving portion 5000 may generate a driving force to rotate the holder 3200 about the third axis (Y-axis) as a rotation axis.

A second ball member B2 may be disposed between the holder 3200 and the guide member 3300. The second ball member B2 may be disposed between the holder 3200 and the guide member 3300 to form a rotating axis of the holder 3200.

The second ball member B2 includes a plurality of balls spaced apart from each other in the third axis (Y-axis) direction.

When viewed in the third axis (Y-axis) direction, a portion of the reflective surface of the reflective member 3100 may overlap with the second ball member B2.

A virtual line extending through the plurality of balls of the second ball member B2 in the direction of the third axis (Y-axis) may pass through the reflective surface of the reflective member 3100.

An attractive force may act between the holder 3200 and the guide member 3300. In an embodiment, a first pulling magnet 5300 may be disposed on one of the holder 3200 and the guide member 3300, and a second pulling yoke 5400 may be disposed on the other one of the holder 3200 and the guide member 3300. In another embodiment, it is possible for the first pulling magnet 5300 to be disposed on both the holder 3200 and the guide member 3300.

One surface of the first pulling magnet 5300 (e.g., a surface facing the second pulling yoke 5400) may be magnetized to have an N-pole, a neutral region, and S-pole sequentially arranged in the third axis (Y-axis) direction.

The first pulling magnet 5300 and the second pulling yoke 5400 may face each other in the second optical axis (Z-axis) direction.

The first pulling magnet 5300 and the second pulling yoke 5400 may generate an attractive force between each other. For example, the second pulling yoke 5400 may be made of a magnetic material. An attractive force acts between the first pulling magnet 5300 and the second pulling yoke 5400 in the direction of the second optical axis (Z-axis).

The second ball member B2 may be maintained in contact with the holder 3200 and the guide member 3300 by the attractive force generated between the first pulling magnet 5300 and the second pulling yoke 5400.

A third guide groove g3 may be formed in surfaces of the holder 3200 and the guide member 3300 facing each other in the second optical axis (Z-axis) direction).

The second ball member B2 may be disposed between the third guide groove g3 of the holder 3200 and the third guide groove g3 of the guide member 3300 to form a rotation axis of the holder 3200.

The reflective module 3000 may further include a stopper 7100. The stopper 7100 may be coupled with the guide member 3300 so as to cover at least a portion of the holder 3200. For example, the stopper 7100 may cover at least a portion of an upper surface of the holder 3200. The stopper 7100 and the holder 3200 may be spaced apart from each other in the direction of the first optical axis (X-axis).

Since the stopper 7100 is spaced apart from the holder 3200, the holder 3200 may be prevented from being separated from the guide member 3300 due to an external impact or other disturbance without interfering with the rotation of the holder 3200.

A buffer member 7200 having an elasticity may be coupled with the stopper 7100. The buffer member 7200 may be disposed on either one or both of two surfaces of the stopper 7100 facing the holder 3200.

Figure 8:
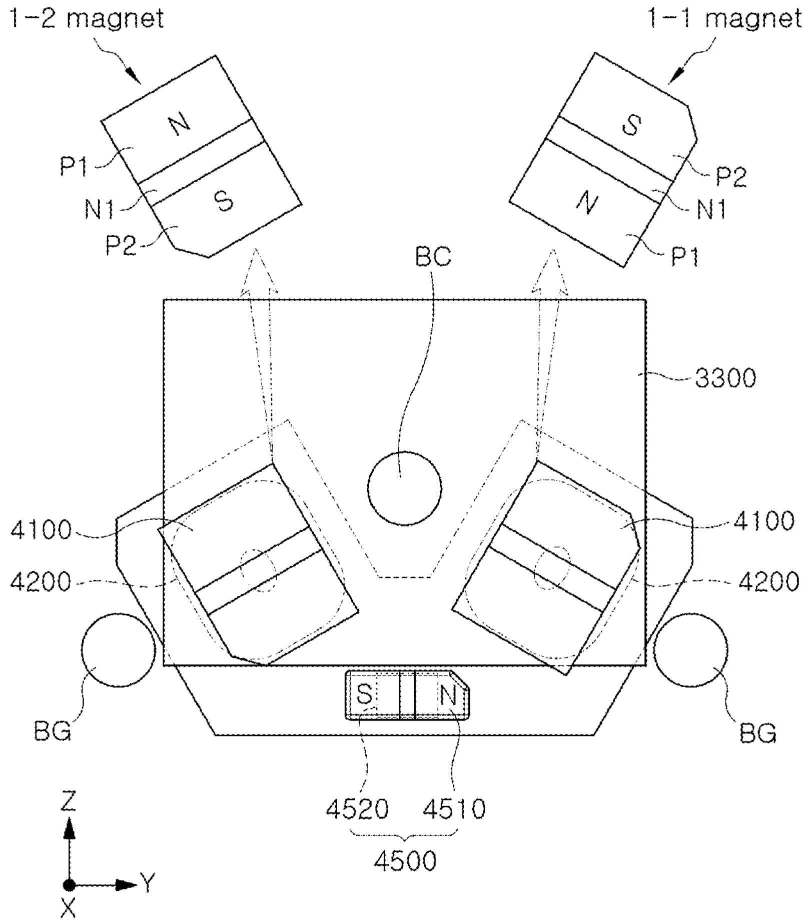
FIG. 8 is a diagram illustrating a first position sensing portion according to an embodiment of the present disclosure.

FIG. 8 is a diagram illustrating a first position sensing portion according to an embodiment of the present disclosure.

The camera module may detect a position of the guide member 3300. For this purpose, a first position sensing portion 4500 is provided. The first position sensing portion 4500 includes a first sensing magnet 4510 and a first position sensor 4520.

When the guide member 3300 is rotated around the first optical axis (X-axis) as a rotation axis, the position of the guide member 3300 may be detected by the first position sensing portion 4500.

The first sensing magnet 4510 may be disposed on one surface (e.g., the lower surface) of the guide member 3300. In addition, the first sensing magnet 4510 may be spaced apart from the first magnet 4100. For example, the first sensing magnet 4510 may be spaced apart from the 1-1 magnet and the 1-2 magnet of the first magnet 4100.

In an embodiment, the first sensing magnet 4510 may be spaced apart from the first ball BC in the direction of the second optical axis (Z-axis).

The first sensing magnet 4510 may be magnetized so that one surface (e.g., the lower surface) may have both an N-pole and an S-pole. In an embodiment, the one surface of the first sensing magnet 4510 may have an N-pole, a neutral region, and an S-pole sequentially arranged in the third axis (Y-axis) direction.

A virtual line extending through the neutral area of the first sensing magnet 4510 in the direction of the second optical axis (Z-axis) may pass through the first ball BC.

The N-pole of the first sensing magnet 4510 may be closer to the N-pole than the S-pole of the 1-1 magnet, and the S-pole of the first sensing magnet 4510 may be closer to the S-pole than the N-pole of the 1-2 magnet.

That is, the first sensing magnet 4510 may be disposed so that the N-pole of the first sensing magnet 4510 is adjacent to the N-pole of the 1-1 magnet, and the S-pole of the first sensing magnet 4510 is adjacent to the S-pole of the 1-2 magnet.

Since the camera module according to an embodiment of the present disclosure includes a separate first sensing magnet 4510 for position sensing of the guide member 3300, the size of the first coil 4200 facing the first magnet 4100 may be increased. Therefore, the magnitude of the driving force generated by the first driving portion 4000 may be increased.

The first position sensor 4520 may be disposed at a position to detect a change in a position of the first sensing magnet 4510. In an embodiment, the first sensing magnet 4510 and the first position sensor 4520 may be disposed to face each other in the direction of the first optical axis (X-axis). In another embodiment, the first sensing magnet 4510 and the first position sensor 4520 may be spaced apart from each other in the direction of the second optical axis (Z-axis) when viewed in the direction of the first optical axis (X-axis).

The first position sensor 4520 may be disposed at a position spaced apart from the first coil 4200. The first position sensor 4520 may be a Hall sensor.

When power is applied to the first coil 4200, an error due to Hall coupling may occur in the position of the guide member 3300 detected by the first position sensor 4520 due to a magnetic field of the first coil 4200. However, since the camera module according to an embodiment of the present disclosure has the first position sensor 4520 spaced apart from the first coil 4200, the accuracy of position sensing of the guide member 3300 may be improved.

In an embodiment, the first position sensor 4520 may be spaced apart from the first ball BC in the direction of the second optical axis (Z-axis).

The housing 1000 may have a through-hole penetrating the housing 1000 in the direction of the first optical axis (X-axis), and a substrate 9000 covering the through-hole may be disposed on the lower surface of the housing 1000. The first position sensor 4520 may be disposed on the upper surface of the substrate 9000 in the through-hole so that the first position sensor 4520 directly faces the first sensing magnet 4510 in the direction of the first optical axis (X-axis).

Figure 9:
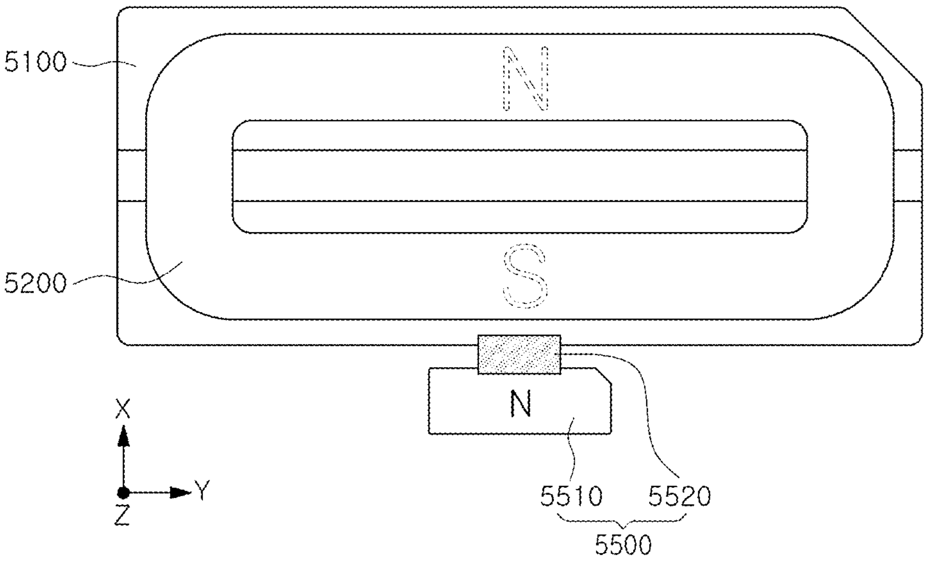
FIG. 9 is a diagram illustrating a second position sensing portion according to an embodiment of the present disclosure.

FIG. 9 is a diagram illustrating a second position sensing portion according to an embodiment of the present disclosure.

The camera module may detect the position of the holder 3200. For this purpose, a second position sensing portion 5500 is provided. The second position sensing portion 5500 includes a second sensing magnet 5510 and a second position sensor 5520.

When the holder 3200 rotates about the third axis (Y-axis), the position of the holder 3200 may be detected by the second position sensing portion 5500.

The second sensing magnet 5510 may be disposed on a side surface of the holder 3200. In addition, the second sensing magnet 5510 may be spaced apart from the second magnet 5100. For example, the second sensing magnet 5510 may be spaced apart from the second magnet 5100 in the direction of the first optical axis (X-axis).

A surface of the second sensing magnet 5510 may have a polarity opposite to a polarity of an adjacent portion of the second magnet 5100.

In an embodiment, a surface of the second magnet 5100 may have an N-pole, a neutral region, and an S-pole sequentially arranged from an upper portion to a lower portion in the direction of the first optical axis (X-axis). In this case, the polarity of surface of the second sensing magnet 5510 may be different depending on the position where the second sensing magnet 5510 is disposed.

For example, as shown in FIG. 9, when the second sensing magnet 5510 is disposed below the second magnet 5100 in the first optical axis (X-axis) direction, a surface of the second sensing magnet 5510 may have an N-pole.

In another example, when the second sensing magnet 5510 is disposed above the second magnet 5100 in the first optical axis (X-axis) direction, a surface of the second magnet 5100 may have an S-pole.

Since the camera module according to an embodiment of the present disclosure includes a separate second sensing magnet 5510 for position sensing of the holder 3200, the size of the second coil 5200 facing the second magnet 5100 may be increased. Accordingly, the magnitude of the driving force generated by the second driving portion 5000 may be increased.

The second position sensor 5520 may be disposed at a position to detect a change in the position of the second sensing magnet 5510.

In an embodiment, the second position sensor 5520 may be disposed so that at least a portion of the second position sensor 5520 faces a space between the second magnet 5100 and the second sensing magnet 5510 in the direction of the first optical axis (X-axis). The space between the second magnet 5100 and the second sensing magnet 5510 may function as a neutral region since it is disposed between different polarities.

The second position sensor 5520 may be spaced apart from the second coil 5200. For example, the second position sensor 5520 may be spaced apart from the second coil 5200 in the direction of the first optical axis (X-axis).

The second position sensor 5520 may be a Hall sensor.

Magnetic force lines may pass in one direction through an upper portion of the second coil 5200 in the direction of the first optical axis (X-axis), and magnetic force lines may pass in another direction opposite to the one direction through a lower portion of the second coil 5200 in the direction of the first optical axis (X-axis).

In addition, magnetic force lines may pass in the other direction through an upper portion of the second position sensor 5520 in the direction of the first optical axis (X-axis), (e.g., a portion of the second position sensor 5520 adjacent to the lower portion of the second coil 5200), and the magnetic force lines may pass in the one direction through a lower portion of the second position sensor 5520 in the direction of the first optical axis (X-axis).

When power is applied to the second coil 5200, an error due to Hall coupling may occur in the position of the holder 3200 detected by the second position sensor 5520 due to the magnetic field of the second coil 5200. However, since the camera module according to an embodiment of the present disclosure has the second position sensor 5520 spaced apart from the second coil 5200, the accuracy of position sensing of the guide member 3300 may be improved.

Figure 10:
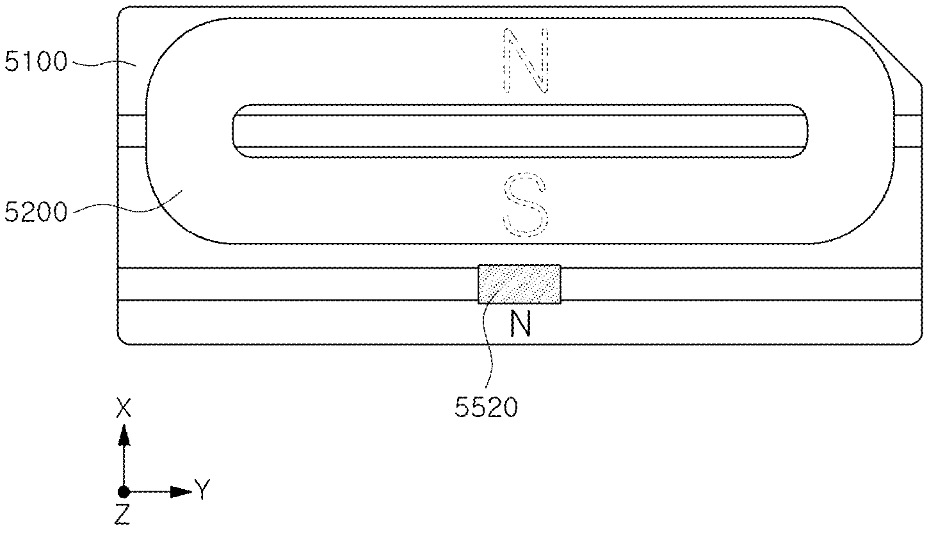
FIG. 10 is a diagram illustrating a first modified example of a second position sensing portion according to an embodiment of the present disclosure.

FIG. 10 is a diagram illustrating a first modified example of a second position sensing portion according to an embodiment of the present disclosure.

In the embodiment of FIG. 10, the second position sensing portion 5500 may include the second position sensor 5520, and may not include a separate sensing magnet like the first position sending magnet 5510 in the embodiment of FIG. 9.

As illustrated in FIG. 10, a portion of the second magnet 5100 of the second driving portion 5000 may be used to generate a driving force, and another portion of the second magnet 5100 may be used in position sensing.

A surface of the second magnet 5100 may have two identical polarities (e.g., a first polarity) and one opposite polarity (e.g., a second polarity). The second coil 5200 may face either of the two first polarities and the second polarity. In addition, the second position sensor 5520 may be disposed so that at least a portion thereof is disposed between the remaining one of the two first polarities and the second polarity.

In an embodiment, a surface of the second magnet 5100 may have an N-pole, a neutral region, an S-pole, a neutral region, and an N-pole sequentially arranged from upper to lower in the direction of the first optical axis (X-axis). At this time, areas of the uppermost and lowermost polarities in the direction of the first optical axis (X-axis) may be different depending on the position where the second position sensor 5520 is disposed.

For example, when the second position sensor 5520 is disposed below the second magnet 5100 in the first optical axis (X-axis) direction, the area of the lowermost polarity of the second magnet 5100 in the first optical axis (X-axis) direction may be smaller than the area of the adjacent opposite polarity.

When the second position sensor 5520 is disposed above the second magnet 5100 in the first optical axis (X-axis) direction, the area of the uppermost polarity of the second magnet 5100 in the first optical axis (X-axis) direction may be smaller than the area of the adjacent opposite polarity.

In the embodiment of FIG. 10, an area of a surface of the second magnet 5100 facing the second coil 5200 may be relatively large, thereby increasing the magnitude of the driving force generated by the second driving portion 5000.

The second position sensor 5520 is spaced apart from the second coil 5200 in the direction of the first optical axis (X-axis), and at least a portion of the second position sensor 5520 may be disposed to face a neutral region of the second magnet 5100.

In an embodiment of FIG. 10, since the second position sensor 5520 is spaced apart from the second coil 5200, the accuracy of position sensing of the holder 3200 may be improved.

Figure 11:
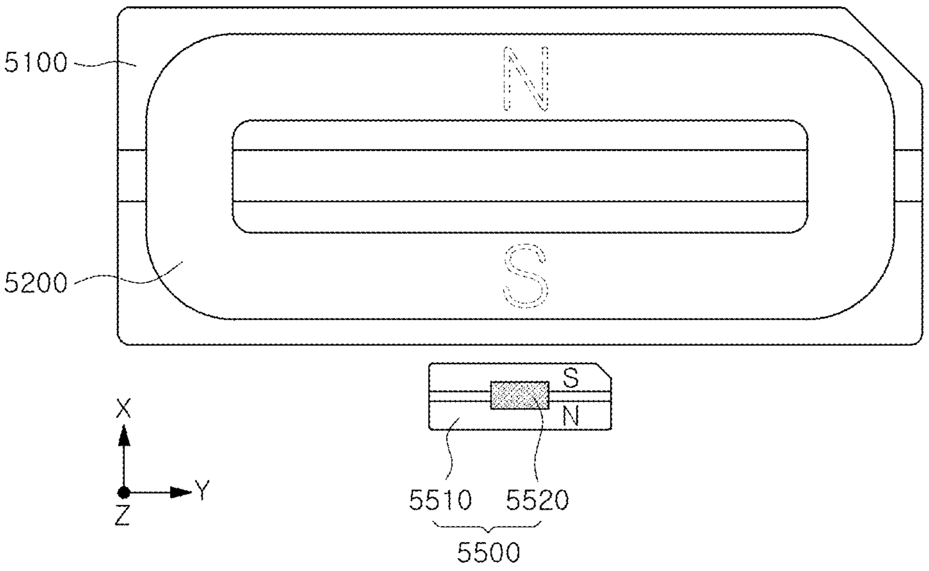
FIG. 11 is a diagram illustrating a second modified example of a second position sensing portion according to an embodiment of the present disclosure.

FIG. 11 is a diagram illustrating a second modified example of a second position sensing portion according to an embodiment of the present disclosure.

In the embodiment of FIG. 11, the second position sensing portion 5500 may include the second sensing magnet 5510 and the second position sensor 5520.

The second sensing magnet 5510 may be spaced apart from the second magnet 5100. For example, the second sensing magnet 5510 may be spaced apart from the second magnet 5100 in the direction of the first optical axis (X-axis).

A surface of the second sensing magnet 5510 may have both an N-pole and an S-pole. In an embodiment, a surface of the second sensing magnet 5510 may have an N-pole, a neutral region, and an S-pole sequentially arranged in the first optical axis (X-axis).

The polarity of a portion of a surface of the second sensing magnet 5510 disposed adjacent to a surface of the second magnet 5100 may be the same as the polarity of a surface of the second magnet 5100 disposed adjacent thereto. Accordingly, the polarity of a surface of the second sensing magnet 5510 may be configured differently depending on the arrangement of the polarity of one surface of the second magnet 5100.

In an embodiment, a surface of the second magnet 5100 may have an N-pole, a neutral region, and an S-pole sequentially arranged from an upper portion to a lower portion in the direction of the first optical axis (X-axis). In this case, a surface of the second sensing magnet 5510 may have an S-pole, a neutral region, and an N-pole sequentially arranged from an upper portion to a lower portion in the direction of the first optical axis (X-axis).

In the embodiment of FIG. 11, since a separate second sensing magnet 5510 is included for position sensing of the holder 3200, the size of the second coil 5200 facing the second magnet 5100 may be increased. Therefore, the magnitude of the driving force generated by the second driving portion 5000 may be increased.

The second position sensor 5520 may be disposed facing the second sensing magnet 5510. In an embodiment, the second position sensor 5520 may be disposed so that at least a portion of the second position sensor 5520 faces the neutral region of a surface of the second sensing magnet 5510.

The second position sensor 5520 may be spaced apart from the second coil 5200. For example, the second position sensor 5520 may be spaced apart from the second coil 5200 in the direction of the first optical axis (X-axis).

The second position sensor 5520 may be a Hall sensor.

In an embodiment of FIG. 11, since the second position sensor 5520 is spaced apart from the second coil 5200, the accuracy of position sensing of the holder 3200 may be improved.

Figure 12:
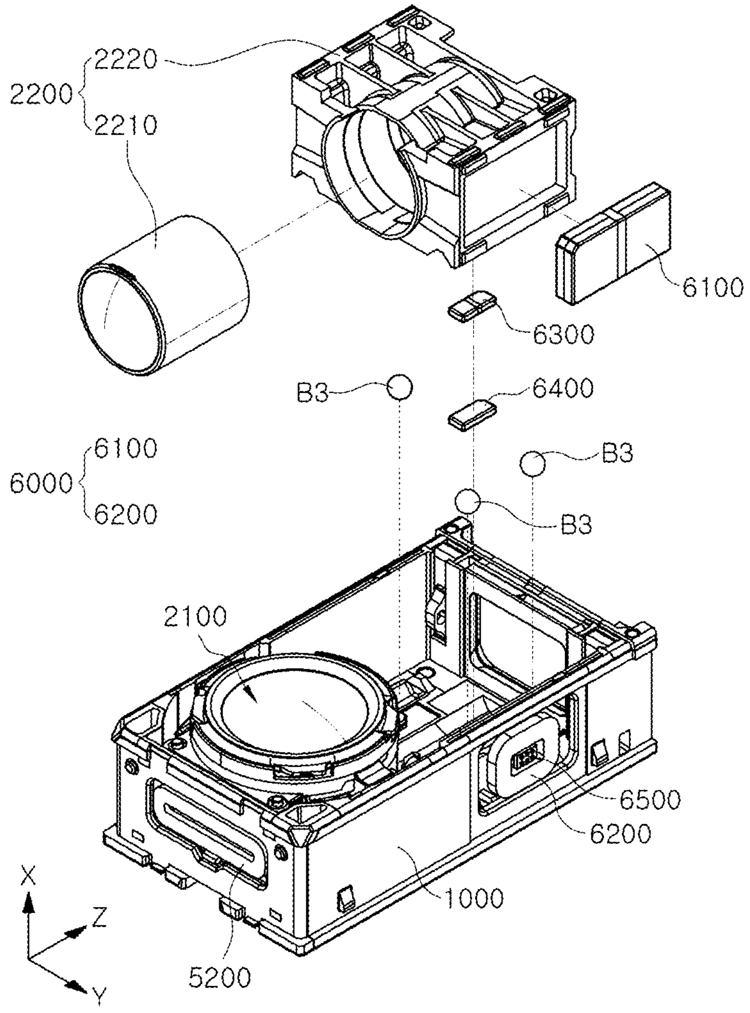
FIGS. 12 and 13 are perspective views illustrating a second lens module separated from a camera module according to an embodiment of the present disclosure.
Figure 13:
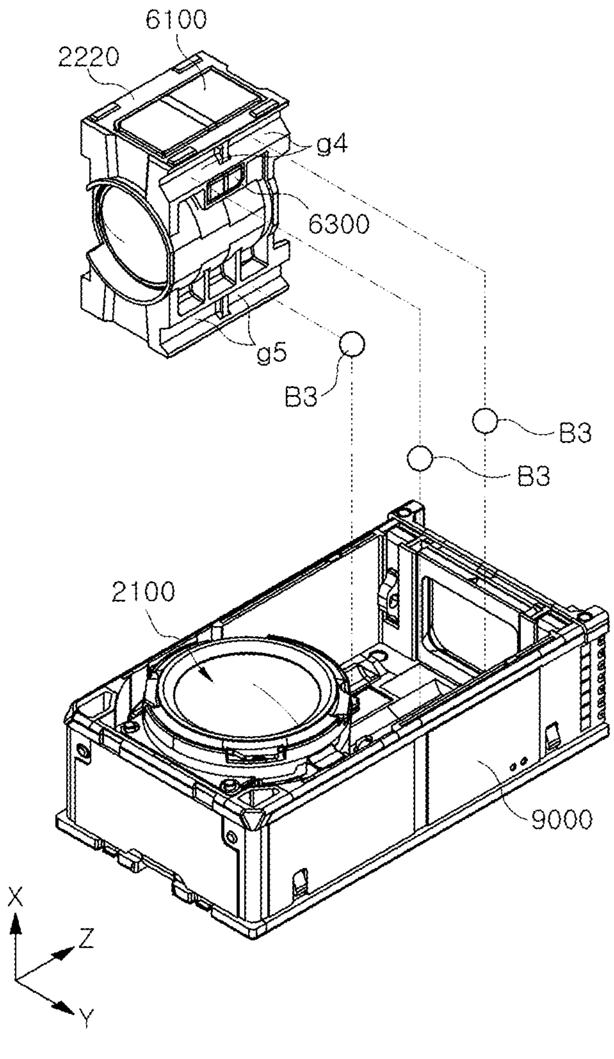

FIGS. 12 and 13 are perspective views illustrating a second lens module separated from a camera module according to an embodiment of the present disclosure.

Referring to FIGS. 12 and 13, a second lens module 2200 may be disposed between the reflective module 3000 and the image sensor module 8000.

The second lens module 2200 may be moved in the second optical axis (Z-axis) direction for focus adjustment.

In an embodiment, the second lens module 2200 includes a second lens barrel 2210 and a carrier 2220. A plurality of lenses may be disposed in the second lens barrel 2210, and the second lens barrel 2210 may be coupled with the carrier 2220.

The camera module may include a third driving portion 6000 to move the second lens module 2200 in the direction of the second optical axis (Z axis).

The third driving portion 6000 includes a third magnet 6100 and a third coil 6200. The third magnet 6100 and the third coil 6200 may be disposed to face each other in a direction perpendicular to the second optical axis (Z-axis).

The third magnet 6100 is mounted on the second lens module 2200. For example, the third magnet 6100 may be disposed on a side surface of the second lens module 2200 (e.g., a side surface of the carrier 2220).

In an embodiment, the second lens module 2200 includes one side surface and another side surface spaced apart from each other in the third axis (Y-axis) direction. The third magnet 6100 may be disposed on the one side surface of the second lens module 2200.

The third magnet 6100 may be magnetized so that a surface of the third magnet 6100 facing the third coil 6200 has both an N-pole and an S-pole. For example, the surface of the third magnet 6100 facing the third coil 6200 may have an N-pole, a neutral region, and an S-pole sequentially arranged in the direction of the second optical axis (Z-axis).

The third coil 6200 is disposed to face the third magnet 6100. For example, the third coil 6200 may be disposed to face the third magnet 6100 in a direction perpendicular to the second optical axis (Z-axis) direction (e.g., in the third axis (Y-axis) direction).

The third coil 6200 is disposed on the substrate 9000, and the substrate 9000 is mounted on the housing 1000 so that the third magnet 6100 and the third coil 6200 face each other in the third axis (Y-axis) direction.

The housing 1000 may have a through-hole penetrating the housing 1000 in the third axis (Y-axis) direction, and the third coil 6200 disposed on the substrate 9000 may directly face the third magnet 6100 through the through-hole in the third axis (Y-axis) direction.

During focus adjustment, the third magnet 6100 is a moving member mounted on the second lens module 2200 and moves in the direction of the second optical axis (Z-axis) together with the second lens module 2200, and the third coil 6200 is a fixed member fixed to the substrate 9000.

When power is applied to the third coil 6200, the second lens module 2200 may be moved in the direction of the second optical axis (Z-axis) by an electromagnetic force generated between the third magnet 6100 and the third coil 6200.

A third ball member B3 is disposed between the second lens module 2200 and the housing 1000, and the second lens module 2200 may be guided by the third ball member B3 to move in the direction of the second optical axis (Z-axis). The third ball member B3 includes a plurality of balls.

A second pulling magnet 6300 may be disposed on the lower surface of the second lens module 2200, and a third pulling yoke 6400 may be disposed on the inner bottom surface of the housing 1000. In another embodiment, the second pulling magnet 6300 may be disposed on both the second lens module 2200 and the housing 1000.

The second pulling magnet 6300 may be disposed closer to one side surface of the second lens module 2200 in the third axis (Y-axis) direction. That is, the second pulling magnet 6300 may be disposed closer to one side surface of the second lens module 2200 than to the other side surface of the second lens module 2200 in the third axis (Y-axis) direction. That is, the second pulling magnet 6300 may be disposed between the one side surface of the second lens module 2200 and the second optical axis (Z axis) in the third axis (Y-axis) direction.

The second pulling magnet 6300 and the third pulling yoke 6400 may be disposed to face each other in the direction of the first optical axis (X-axis).

The second pulling magnet 6300 and the third pulling yoke 6400 may generate an attractive force therebetween. For example, an attractive force is generated between the second pulling magnet 6300 and the third pulling yoke 6400 in the direction of the first optical axis (X-axis).

The third ball member B3 may be maintained in contact with the second lens module 2200 and the housing 11000 due to the attractive force generated between the second pulling magnet 6300 and the third pulling yoke 6400.

Some balls of the plurality of balls of the third ball member B3 may be disposed closer to the one side surface of the second lens module 2200 than to the other side surface of the second lens module 2200 in the third axis (Y-axis) direction, and the remaining balls of the plurality of balls of the third ball member B3 may be disposed closer to the other side surface of the second lens module 2200 than to the one side surface of the second lens module 2200 in the third axis (Y-axis) direction.

The number of balls of the third ball member B3 disposed between the one side surface of the second lens module 2200 and the second optical axis (Z-axis) may be greater than the number of balls of the third ball member B3 disposed between the other side surface of the second lens module 2200 and the second optical axis (Z-axis).

In an embodiment, the third ball member B3 may include three balls. Two of the three balls may be disposed between the one side surface of the second lens module 2200 and the second optical axis (Z-axis), and the remaining one of the three balls may be disposed between the other side surface of the second lens module 2200 and the second optical axis (Z-axis).

Two balls disposed between the one side surface of the second lens module 2200 and the second optical axis (Z-axis) may be spaced apart in the direction of the second optical axis (Z-axis).

A fourth guide groove g4 and a fifth guide groove g5 may be formed in surfaces of the second lens module 2200 and the housing 1000 facing each other. For example, the fourth guide groove g4 may be formed in one side of the surfaces of the second lens module 2200 and the housing 1000 facing each other, and the fifth guide groove g5 may be formed in the other side of the surfaces f the second lens module 2200 and the housing 1000 facing each other.

The fourth guide groove g4 and the fifth guide groove g5 may be spaced apart from each other in the direction of the third axis (Y-axis).

The fourth guide groove g4 and the fifth guide home g5 may extend in directions parallel to the second optical axis (Z-axis).

Some balls of the plurality of balls of the third ball member B3 are disposed in the fourth guide groove g4, and remaining balls of the plurality of balls of the third ball member B3 are disposed in the fifth guide groove 5.

The number of contact points between the some balls of the plurality of balls of the third ball member B3 and the fourth guide groove g4 is greater than the number of contact points between the remaining balls of the plurality of balls of the third ball member B3 and the fifth guide groove g5.

The fourth guide groove g4 is disposed closer to the one side surface of the second lens module 2200 on which the third magnet 6100 is disposed than the fifth guide groove G5.

The second pulling magnet 6300 may be disposed closer to the fourth guide groove g4 than to the fifth guide groove g5.

In an embodiment, the camera module may detect the position of the second lens module 2200. For this purpose, a third position sensor 6500 is provided. The third position sensor 6500 may be disposed at a position facing the third magnet 6100 of the third driving portion 6000 (e.g., a position facing in the direction of the third axis (Y-axis)).

Accordingly, when the second lens module 2200 moves in the direction of the second optical axis (Z-axis), the position of the second lens module 2200 may be detected by the third position sensor 6500.

The third position sensor 6500 may be a Hall sensor.

Although not illustrated in the drawing, at least one lens (hereinafter referred to as a correction lens) may be coupled with the reflective member 3100 of the reflective module 3000. The correction lens may have a positive refractive power.

In an embodiment, an emission surface of the reflective member 3100 of the reflective module 3000 and an object-side surface of the correction lens may be coupled to each other.

Accordingly, when the reflective module 3000 is rotated, the correction lens may also be rotated together with the reflective module 3000.

When a correction lens having a positive refractive power is disposed behind the reflective member 3100 of the reflective module 3000 an in this embodiment of the present disclosure, an error in the optical path that occurs during shake correction may be compensated, and high-quality images may be captured.

While this disclosure includes specific examples, it will be apparent after an understanding of the disclosure of this application that various changes in form and details may be made in these examples without departing from the spirit and scope of the claims and their equivalents. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reflective module comprising:

a housing;

a guide member disposed in the housing and configured to rotate about a first rotation axis;

a holder disposed on the guide member and configured to rotate relative to the guide member about a second rotation axis perpendicular to the first rotation axis;

a reflective member disposed on the holder;

a first driving portion comprising a first magnet disposed on the holder, and a first coil facing the first magnet; and a first position sensor disposed in the housing, wherein the first position sensor is spaced apart from the first coil in a direction of the first rotation axis.

2. The reflective module of claim 1, wherein a surface of the first magnet has a first polarity, a first neutral region, a second polarity, a second neutral region and a first polarity sequentially arranged in the direction of the first rotation axis, and at least a portion of the first position sensor faces the second neutral region.

3. The reflective module of claim 2, wherein an area of the second polarity of the first magnet is greater than an area of one of the two first polarities.

4. The reflective module of claim 3, wherein the one of the two first polarities is disposed adjacent to the second neutral region.

5. The reflective module of claim 1, further comprising a first sensing magnet disposed on the holder and spaced apart from the first magnet in the direction of the first rotation axis, wherein the first position sensor is disposed so that at least a portion of the first position sensor faces a space between the first magnet and the first sensing magnet.

6. The reflective module of claim 1, further comprising a first sensing magnet disposed on the holder and spaced apart from the first magnet in the direction of the first rotation axis, wherein a surface of the first magnet has a first polarity, a neutral region, and a second polarity sequentially arranged in the direction of the first rotation axis, and a surface of the first sensing magnet has one polarity, and the one polarity of the first sensing magnet is opposite to a polarity of the first magnet adjacent to the first sensing magnet.

7. The reflective module of claim 1, further comprising a first sensing magnet disposed on the holder and spaced apart from the first magnet in the direction of the first rotation axis, wherein a surface of the first magnet has a first polarity, a neutral region, and a second polarity sequentially arranged in the direction of the first rotation axis, and a surface of the first sensing magnet has a second polarity, a neutral region, and a first polarity sequentially arranged in the direction of the first rotation axis.

8. The reflective module of claim 7, wherein at least a portion of the first position sensor faces the neutral region of the first sensing magnet.

9. The reflective module of claim 1, further comprising a first ball member disposed between the holder and the guide member and comprising a plurality of balls spaced apart from each other in a direction of the second rotation axis.

10. The reflective module of claim 1, further comprising:

a second driving portion comprising a second magnet disposed on the guide member, and a second coil facing the second magnet;

a second sensing magnet disposed on the guide member; and a second position sensor disposed in the housing, wherein the second position sensor is spaced apart from the second coil in a direction perpendicular to the first rotation axis.

11. The reflective module of claim 10, further comprising a second ball member disposed between the guide member and the housing and comprising a first ball forming the first rotation axis, wherein the second sensing magnet is spaced apart from the first ball in a direction perpendicular to both the first rotation axis and the second rotation axis.

12. The reflective module of claim 10, wherein the second sensing magnet has a first polarity, a neutral region, and a second polarity sequentially arranged in a direction of the second rotation axis.

13. A camera module comprising:

a holder;

a reflective member disposed on the holder;

a guide member on which the holder is disposed;

a housing in which the holder and the guide member are disposed;

a lens module having an optical axis into which light reflected from the reflective member is incident;

a first driving portion comprising a first magnet mounted on the holder, and a first coil facing the first magnet in a direction of the optical axis; and a first position sensor disposed in the housing, wherein the guide member is configured to rotate together with the holder about a first rotation axis, the holder is configured to rotate relative to the guide member about a second rotation axis perpendicular to the first rotation axis, and the first position sensor is spaced apart from a virtual line extending along the optical axis in a direction of the first rotation axis.

14. The camera module of claim 13, wherein a surface of the first magnet has one or more neutral regions arranged in a direction of the second rotation axis.

15. The camera module of claim 14, wherein magnetic force lines pass in one direction through an upper portion of the first coil in the direction of the first rotation axis, magnetic force lines pass in another direction opposite to the one direction through a lower portion of the first coil in the direction of the first rotation axis, magnetic force lines pass in the other direction through an upper portion of the first position sensor in the direction of the first rotation axis, and magnetic force lines pass in the one direction through a lower portion of the first position sensor in the direction of the first rotation axis.

* * * * *